(12) United States Patent
Urbanzyk et al.

(10) Patent No.: US 6,609,831 B2
(45) Date of Patent: Aug. 26, 2003

(54) METHOD AND ARRANGEMENT FOR MONITORING BEARINGS ROLLING ALONG A GUIDE RAIL, ESPECIALLY BEARINGS OF A TENTER CHAIN OF A TENTERING MACHINE

(75) Inventors: Kai Urbanzyk, Lindau (DE); Andreas Rutz, Lindau (DE)

(73) Assignee: Lindauer Dornier Gesellschaft mbH, Lindau (DE)

( * ) Notice: Subject to any disclaimer, the term of this patent is extended or adjusted under 35 U.S.C. 154(b) by 0 days.

(21) Appl. No.: 10/056,340

(22) Filed: Jan. 23, 2002

(65) Prior Publication Data

US 2002/0100151 A1 Aug. 1, 2002

(30) Foreign Application Priority Data

Jan. 27, 2001 (DE) .................... 201 01 447 U (51) Int. Cl.[7] ............... F16C 32/00; F16C 41/04
(52) U.S. Cl. ...................................... 384/448
(58) Field of Search ................ 384/448; 73/37.6

(56) References Cited

U.S. PATENT DOCUMENTS 5,501,569 A  *  3/1996  Yamazaki et al. ........ 414/676
5,642,943 A  *  7/1997  Szeremeta ................ 384/100
5,671,825 A  *  9/1997  Wong et al. ............. 184/6.4
5,771,547 A  *  6/1998  Hommes et al. ............ 26/93
6,175,547 B1 *  1/2001  Kogure .................. 369/269
6,524,004 B2 *  2/2003  Fujikawa et al. ........ 384/100

FOREIGN PATENT DOCUMENTS

JP          03074628       *  3/1991

* cited by examiner

Primary Examiner—Christopher P. Schwartz
Assistant Examiner—Devon Kramer
(74) Attorney, Agent, or Firm—W. F. Fasse; W. G. Fasse (57) ABSTRACT

A method and apparatus continuously monitor the functional condition of the successive bearings of the tenter clips or claws of a tenter chain as the bearings roll along a contact surface of the endless guide rail of a tentering machine. A sensing arrangement is integrated into the guide rail in the area of the contact surface thereof. The sensing arrangement senses a physical value indicative of the presence and condition of the respective bearing passing by the sensing arrangement. The sensing arrangement may include a pressurized air outlet and an adjacent pressure measuring channel connected to a pressure sensor to sense the back pressure created by a passing bearing. The sensing arrangement may alternatively include an electromagnetic eddy current sensor, or an optoelectronic light beam sensor.

14 Claims, 5 Drawing Sheets

METHOD AND ARRANGEMENT FOR MONITORING BEARINGS ROLLING ALONG A GUIDE RAIL, ESPECIALLY BEARINGS OF A TENTER CHAIN OF A TENTERING MACHINE

PRIORITY CLAIM

This application is based on and claims the priority under 35 U.S.C. §119 of German Patent Application 201 01 447.5, filed on Jan. 27, 2001, the entire disclosure of which is incorporated herein by reference.

FIELD OF THE INVENTION

The invention relates to a method and an arrangement for monitoring the condition of roller bearings or ball bearings, and especially the outer rings of such bearings, rolling along a guide rail. The invention especially relates to monitoring the bearings of tenter clips or claws of a tenter chain running along the endless guide rails of a tentering or stretching machine.

BACKGROUND INFORMATION

It is generally known to use tentering or stretching machines, for example to carry out the biaxial stretching of thermoplastic synthetic polymer films. Such tentering machines typically include two endless guide rails or guide tracks, which have respective guide rail sections that respectively extend parallel to each other, diverge from each other and/or converge toward each other. The respective path of the two guide rails relative to each other determines the degree and progression of the stretching in at least one direction. The tentering machine further includes tenter chains that are each respectively made up of successive tenter clips or claws, and that run along the respective endless guide rails. Thereby, each tenter clip or claw is supported against the respective associated guide rail by a respective roller bearing or ball bearing, which are inclusively termed "rolling bearings" herein. Each rolling bearing includes an inner ring or race that is connected to the associated tenter clip or claw, an outer ring or race that bears and rolls against a support contact surface of the guide rail, and a set of balls or roller pins movably and supportingly arranged between the inner ring and the outer ring. The tentering machine further comprises at least one drive that is respectively connected to each respective tenter chain, so that the tenter chains carry out a progressive motion that is synchronous relative to each other along the two endless guide rails.

In the operation of such tentering machines, especially with rather high speed or fast-running tenter chains supported by rolling bearings, the rolling bearings are subject to fatigue and wear after a long period of operation. Ultimately, the result of such fatigue and wear can lead to the breakage or loss of the outer ring of any respective one or more of the bearings. This, of course, negatively influences the proper rolling support of the affected tentering clip or claw, but can also have more serious and far-reaching disadvantages. For example, the broken pieces of an outer ring of a broken rolling bearing can abrade or wear other components of the operating tentering machine, or can lead to a jamming of the tenter chain along the guide rails. This in turn requires the machine to be shut down and to be repaired and serviced, which is also reflected in the lost production output of the machine. For these reasons, there is a need in this field to be able to monitor the wear or other aspects of the functional condition of the rolling bearings, and to sense and indicate when a bearing has been worn to an unacceptable extent or when an outer ring of a bearing has been broken or lost.

SUMMARY OF THE INVENTION

In view of the above, it is an object of the invention to provide a method and an arrangement with which the functionality of the rolling bearings supporting the tenter clips or claws on the endless guide rails can be monitored during the ongoing operation of the tentering machine. The invention further aims to avoid or overcome the disadvantages of the prior art, and to achieve additional advantages, as apparent from the present specification.

The above objects have been achieved according to the invention in an arrangement comprising a guide rail and a rolling bearing including an outer ring, an inner ring, and balls or roller pins therebetween, wherein the outer ring of the rolling bearing rolls along a contact surface of the guide rail. The inventive arrangement especially further comprises a sensor or detector for sensing a physical value that is dependent on and indicative of a condition of the rolling bearing. The above objects have further been achieved according to the invention in a method of monitoring the condition of the rolling bearing in such an arrangement, by sensing or detecting the physical value, comparing the physical value to an acceptable threshold or parameter range, and then providing a fault signal in the event the detected physical value is not within the acceptable threshold or parameter range.

A significant feature of the invention is the provision of a sensing or detecting arrangement in the area at which the outer ring of a rolling bearing normally contacts the contact surface of the guide rail, whereby this sensing or detecting arrangement is adapted to sense a physical value that is dependent on and indicative of a condition of the rolling bearing as the bearing passes by this location on the guide rail. In this manner, the sensing or detecting arrangement (sometimes simply called a sensor herein) can successively sense the corresponding physical value of each one of the rolling bearings of each one of the tenter clips or claws of the tenter chain as they successively pass by the sensor location on the guide rail, during the continuous normal operation of the tentering machine.

Since the sensed physical value is dependent on and indicative of a condition of the rolling bearing that is respectively passing by the sensor, the sensor can thereby detect if the respective bearing is excessively worn, or especially if the respective bearing is already missing its outer ring, because the detected physical value would be correspondingly different from the normal or expected or acceptable range of this value. According to the invention, the physical value may, for example, be the backed-up or feedback pressure of an air flow being provided by a pneumatic air supply arrangement, or the influenced magnetic field of an electromagnetic sensor device, or the interrupted or reflected light beam of an optoelectronic sensor device.

In a preferred embodiment, the physical value to be sensed is the backed-up or feedback pressure of a supplied flow of pressurized air, as it is influenced by the passing of a respective rolling bearing. In this context, the sensing arrangement comprises a sleeve-shaped body that is arranged in a hole bored in the guide rail, in such a manner so as to form an annular ring-shaped air outlet opening annularly around the sleeve-shaped body, i.e. bounded between the outer wall of the sleeve-shaped body and an inner cylindrical wall of the bored hole in the guide rail. An air supply line is connected from a source of pressurized air to the annular air outlet. The hollow cylindrical interior of the sleeve-shaped body forms a pressure measuring or sensing channel that is concentrically surrounded by the annular air outlet opening, and that is connected by a pressure sensing or measuring line to a pressure sensor or pressure measuring arrangement, which may have any conventionally known structure and operation. Pressurized air is preferably continuously supplied to the annular air outlet, from which the pressurized air blows outwardly away from the guide rail surface in which the air pressure sensing arrangement is provided. This surface is especially the contact surface along which the rolling bearings roll.

When there is no rolling bearing at the location of the air pressure sensing arrangement at a given time, the pressure prevailing in the pressure measuring channel will be a neutral pressure, for example, the ambient surrounding air pressure, or a pressure slightly above or slightly below the ambient surrounding air pressure due to any venturi or nozzle effect of the pressurized air being ejected out of the annular air outlet opening that surrounds the pressure measuring channel. On the other hand, when an intact rolling bearing rolls over the area of the air pressure sensing arrangement, the pressurized air supplied through the annular air outlet opening will be at least partially confined or backed-up by the contact surface of the rolling bearing against the contact surface of the guide rail, which will cause a backed-up or feedback pressure in the central pressure measuring channel.

The actual pressure prevailing in the pressure measuring channel at any time is provided to the pressure sensor or pressure measuring arrangement, which in turn responsively thereto generates an electrical actual pressure signal. This electrical actual pressure signal is then compared to a nominal, rated, or desired electrical signal, or especially an acceptable signal threshold or acceptable signal value range. If the actual pressure signal deviates from the nominal or desired pressure signal by more than an acceptable tolerance value, or if the actual pressure signal falls below an acceptable pressure threshold or outside of an acceptable pressure range, then this result causes the generation or release of a fault signal that is used to automatically stop the machine, or to provide a fault indication to the operator of the machine.

In order to prevent contaminant particles from accumulating in and thereby blocking the pressure measuring channel, which would lead to a falsification of the pressure measurement result and the associated actual pressure signal, the pressure measuring channel is cleaned or flushed at regular time intervals. This cleaning process preferably comprises blowing pressurized air outwardly through the measuring channel to blow any accumulated contaminant particles out of the channel. This is achieved according to the invention by arranging a controllable multi-path valve in the pressure measuring line between the outlet of the pressure measuring channel and the pressure sensor or pressure measuring arrangement. This multi-path valve is further connected to a source of compressed or pressurized air, so that switching the valve will connect the source of pressurized air to the pressure measuring line, so as to blow pressurized air through the pressure measuring line and outwardly through the pressure measuring channel in a "backwards" flow direction opposite the normal direction for the pressure measurement.

In further embodiments according to the invention, the sensor arrangement used to sense the physical value indicative of the condition of the rolling bearing may be an electromagnetic sensing arrangement such as an eddy current sensor, or an optoelectronic sensing arrangement such as a light beam emitter and a light sensor that senses the interruption or the reflection of the light beam.

The method and arrangement according to the invention advantageously enable a continuous monitoring of the operating condition of the rolling bearings during the ongoing operation of the tentering machine. The invention makes it possible to essentially immediately react to an excessive wear or rupture failure of any one of the rolling bearings, so as to immediately take any required corrective action in the operating process of the tentering machine. Thereby, the occurrence of more-substantial damage to other components of the machine can be avoided. While the present specification describes the inventive arrangement in connection with a guide rail of a tentering machine, it should be understood that the invention similarly applies to any machine or apparatus in which a ball bearing or roller bearing rolls along a guide rail.

DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
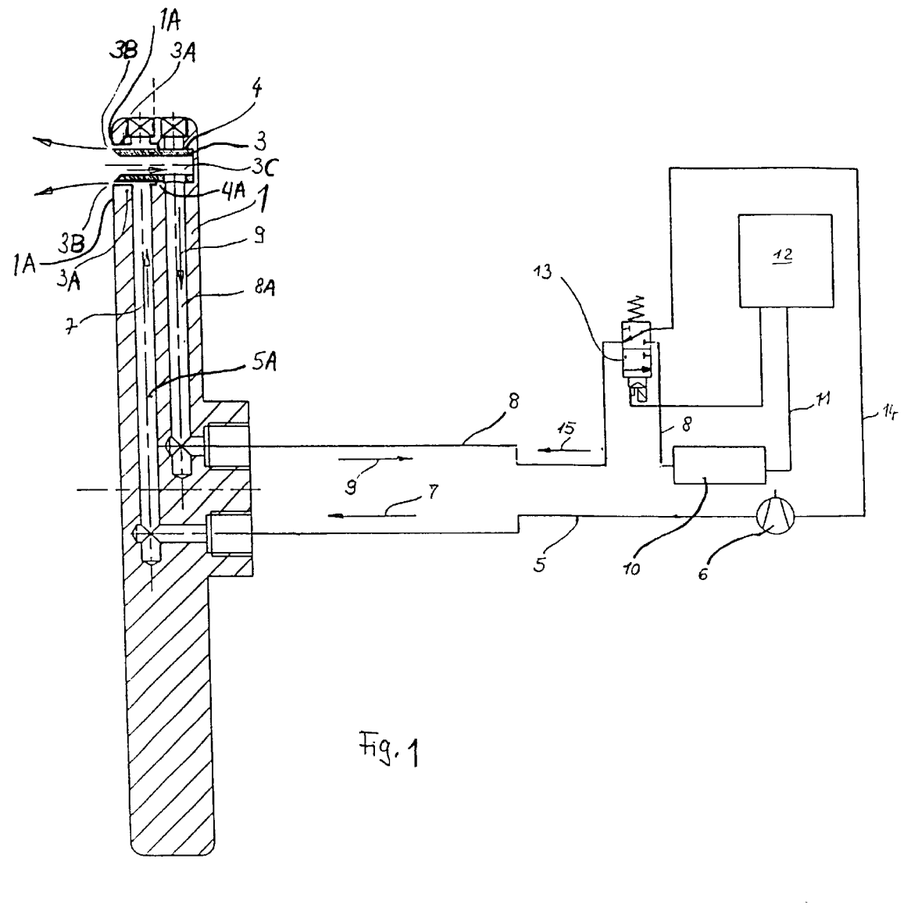
FIG. 1 is a sectional view taken on a vertical section plane, of a pneumatic pressure sensing arrangement incorporated in a guide rail for rolling bearings, and a schematic diagram of the monitoring arrangement connected thereto according to the invention.
Figure 2:
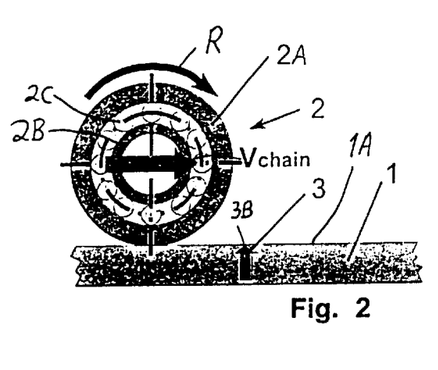
FIGS. 2, 3 and 4 are successive top-view schematic diagrams of a bearing rolling along the guide rail with the pressure sensor arrangement incorporated therein, at respective positions before, during and after rolling over the pressure sensing arrangement.
Figure 3:
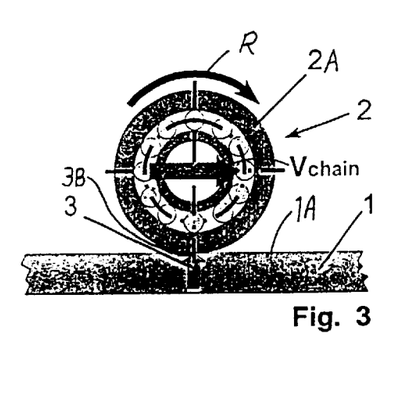
Figure 4:
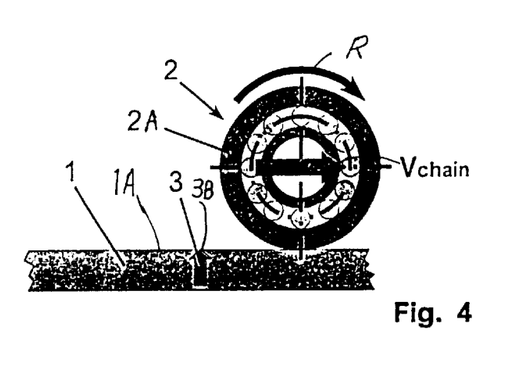

The schematic sectional view of FIG. 1 shows a first embodiment of a bearing condition monitoring arrangement according to the invention, integrated into an endless guide rail 1, for example a guide rail for guiding a tenter chain of a tentering machine. In this embodiment, the monitoring arrangement operates on the basis of pneumatic pressure, as will be described. The tenter chain with its tenter clips or claws and its supporting rolling bearings is not shown in FIG. 1. Such a bearing 2, with an outer ring or race 2A, an inner ring or race 2B, and a set of roller pins or balls 2C therebetween, is schematically shown in FIGS. 2, 3 and 4 for example. It should further be understood that the outer circumference of the outer ring 2A of each successive bearing 2 is supported against and rolls along a contact surface 1A at the upper left of the guide rail 1 as shown in FIG. 1.

A hole 4 is bored into the guide rail 1 in the area of this contact surface 1A. The bored hole 4 preferably has a stepped circumferential wall 4A, namely with a smaller diameter in its deeper half at its blind end, and a larger diameter at its outer half depth and adjoining the opening thereof in the contact surface 1A. A sleeve-shaped hollow cylindrical body 3 is inserted into the hole 4, with a tight fit between the sleeve-shaped body 3 and the narrower diameter portion of the hole 4, and with an annular gap between the sleeve-shaped body 3 and the larger diameter portion of the hole 4. This annular gap forms an annular flow channel 3A that opens outwardly through a ring-shaped or annular outlet opening 3B in the contact surface 1A of the guide rail 1.

As will be described below, an airstream is supplied to the annular flow channel 3A and blown out through the annular air outlet opening 3B against the rolling contact surface of the outer ring 2A of the bearing 2 as it passes over the opening 3B. Preferably, this air flow is provided in a continuous manner. The bored hole 4 and the sleeve-shaped body 3 are located in the contact surface 1A of the guide rail 1 so that the successive bearings 2 will all roll directly over the hole 4 and particularly the annular air outlet opening 3B during the normal operation of the tentering machine.

To supply the pressurized air to the annular flow channel 3A as described above, a pressurized air line 5 is connected from a pressurized air source 6 via a pressurized air passage 5A in the guide rail 1 to the annular air flow channel 3A. During operation of the tentering machine, pressurized air is, preferably continuously, provided in the direction of arrows 7 from the pressurized air source 6, through the pressurized air line 5 and the pressurized air passage 5A into the annular flow channel 3A, and from there it blows outwardly from the contact surface 1A through the annular air outlet 3B.

The hollow cylindrical center area of the cylindrical sleeve-shaped body 3 forms an air back-pressure sensing or measuring channel 3C, which is connected through a pressure measuring passage 8A in the guide rail 1 and further via a pressure measuring line 8 to a pressure sensor or pressure measuring arrangement 10. Thus, the air pressure prevailing in the pressure measuring channel 3C, or a pressure pulse arising therein at any time, is transmitted in the direction of arrows 9 through the pressure measuring passage 8A and the pressure measuring line 8 to the pressure sensor 10. There the pressure is measured and converted in any known manner into a corresponding electrical actual pressure signal, which is then provided via a pressure signal line 11 to an electronic controller such as the overall machine controller 12, which evaluates the actual pressure signal in a manner described herein, and can then give suitable indications or take suitable control steps responsive to the actual pressure signal.

Whenever the annular air outlet 3B is not blocked or covered by a rolling bearing 2, i.e. periods of time between successive rolling bearings 2, the pressurized air is freely emitted from the annular air outlet opening 3B. At this time, the pressure prevailing in the pressure measuring channel 3C is a neutral pressure, such as the surrounding ambient air pressure, or a steady state neutral pressure arising due to any fluid flow effects of the constant annular flow of air emitted from the annular air outlet opening 3B.

On the other hand, whenever a resistance or flow blockage influences the free flow of the pressurized air out of the annular air outlet opening 3B, a feedback pressure or backed-up pressure will be built up in the pressure measuring channel 3C. This is the case whenever the outer ring 2A of a respective bearing 2 rolls over the annular air outlet opening 3B and the pressure measuring channel 3C provided in the contact surface 1A of the guide rail 1. The resulting back pressure, particularly a back pressure pulse, which arises in the pressure measuring channel 3C, is transmitted in the direction of arrows 9 via the pressure measuring passage 8A and the pressure measuring line 8 to the pressure sensor 10. Responsively thereto, the actual pressure signal emitted by the pressure sensor 10 on the signal line 11 will exhibit a corresponding signal level or signal pulse indicative of the pressure pulse that arose in the pressure measuring channel 3C. This pressure signal pulse is evaluated and processed in the controller 12 as will be described below.

The inventive arrangement further preferably, but optionally, includes measures to prevent contaminant particles from accumulating in and blocking the pressure measuring channel 3C and/or the pressure measuring passage 8A and the pressure measuring line 8. In this regard, a multi-path valve 13 is interposed in the pressure measuring line 8 between the pressure measuring channel 3C and the pressure sensor 10. Another pressurized air line 14 leads from the pressurized air source 6 to a further connection port of the multi-path valve 13. Thus, the valve 13 alternatively and selectively connects the pressure measuring line 8 either to the pressure sensor 10 or to the pressurized air source 6 (which is the switching state of the valve illustrated in FIG. 1). With this arrangement, at predetermined time intervals under the control of the controller 12, the multipath valve 13 is switched so as to supply pressurized air from the pressurized air line 14, back through the pressure measuring line 8 and the pressure measuring passage 8A in the back-flushing flow direction 15, so as to be emitted outwardly through the pressure measuring channel 3C. Thereby, any contaminant particles that may have become accumulated in the measuring channel 3C, the measuring passage 8A, and the measuring line 8 up to the valve 13 are blown back out of this air flow path through the measuring channel 3C.

The operation of the first embodiment of the monitoring arrangement according to FIG. 1 will now be described in connection with FIGS. 2 to 7 and 2A to 7A.

FIGS. 2 to 4 and 2A to 4A schematically represent the normal case of the normal operation of the tentering machine, whereby an intact rolling bearing 2, including an outer ring 2A, an inner ring 2B, and roller pins or balls 2C therebetween, rolls along the contact surface 1A of the guide rail 1. Thereby, the bearing 2 moves forward at the velocity of the chain, namely Vchain, while rollingly rotating in the direction R with the outer circumferential surface of the outer ring 2A along the contact surface 1A of the guide rail 1.

In FIGS. 2, 3 and 4, an arrow 3 schematically represents the integration of the sleeve-shaped body 3 in the bored hole 4 in the guide rail 1 to form the pneumatic sensing arrangement as described above in connection with FIG. 1. FIG. 2 shows a stage at which the bearing 2 has not yet reached the location of the sensing arrangement indicated by the arrow 3, while FIG. 3 shows the stage at which the intact outer ring 2A of the bearing 2 has rolled directly onto the sensing arrangement shown by arrow 3, and FIG. 4 shows the stage in which the bearing 2 has already rolled past the sensing arrangement shown by arrow 3.

Figure 2A:
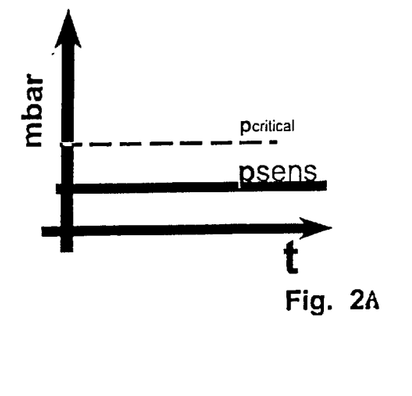
FIGS. 2A, 3A and 4A are respective schematic diagrams showing the pressure sensed by the pressure sensing arrangement, with respect to time, respectively in connection with the situations shown in FIGS. 2, 3 and 4 in sequence.
Figure 3A:
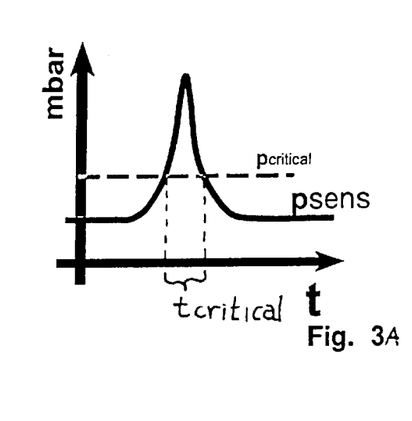
Figure 4A:
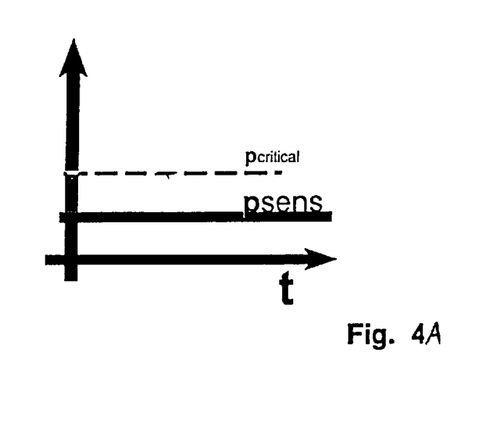

FIGS. 2A, 3A and 4A respectively show the pressure psens that is sensed in the pressure measuring channel 3A, i.e. as indicated by the actual pressure signal generated by the pressure sensor 10 on the signal line 11. The FIGS. 2A, 3A and 4A respectively show the sensed pressure signal at the respective stages shown in FIGS. 2, 3 and 4 in sequence. In FIG. 2A, corresponding to the stage shown in FIG. 2, the measured pressure psens remains constant over time while the bearing 2 has not yet reached the location of the pressure sensing arrangement. At this point, the pressure psens in millibars corresponds to the normal neutral pressure prevailing in the pressure sensor 10.

The sensed pressure psens is converted into a corresponding actual pressure signal that is provided to the controller 12. A critical pressure value or threshold pcritical has been set in the controller 12. If this critical pressure threshold is reached or exceeded by the actual pressure signal, this will be evaluated as an indication that a normal back-pressure has arisen in the pressure measuring channel 3C in the inventive arrangement, due to the passage of a bearing 2 rolling over the annular air outlet opening 3B and the back-pressure measuring channel 3C during the operation of the tenter chains along the guide rail 1. The cause of this arising back-pressure is that the outer ring 2A of one of the successive tenter clip rolling bearings 2, at a prescribed time point in a time sequence, has rolled over and thereby temporarily covered the annular air outlet opening 3B, while deflecting or confining the pressurized air to exert a back-pressure into the pressure sensing channel 3C. Such a situation is shown in FIGS. 3 and 3A.

When the actual pressure signal psens exceeds the critical pressure threshold pcritical, the controller 12 interprets this as the passage of a normal intact bearing 2 past the location of the sensing arrangement. This can be indicated, for example, by generating a binary signal that indicates the normal passage of an intact bearing 2. Alternatively, this can be indicated by not triggering, generating or releasing a fault signal, so that the normal situation shown in FIG. 3A will not be signaled, but instead, only fault conditions will be signaled.

As further schematically indicated in FIG. 3A, the controller 12 can also evaluate the time duration during which the actual pressure signal exceeds the critical pressure threshold pcritical, to how this time duration compares to a target or threshold duration tcritical. Such time or waveform information of the generated pressure pulse can be evaluated to give further indications of the wear condition or proper functionality condition of the bearing 2, in comparison to the expected normal time duration tcritical of exceeding the pressure threshold pcritical. In any event, the time points at which successive bearings will roll over the sensing arrangement location during the operation of the tenter chain are predetermined, so that the controller 12 "looks for" or expects to receive and evaluate such an actual pressure signal exceeding the critical pressure threshold pcritical at particular points or ranges in time. A failure to receive a proper normal signal at the proper time will result in the triggering of a fault signal.

Figure 5:
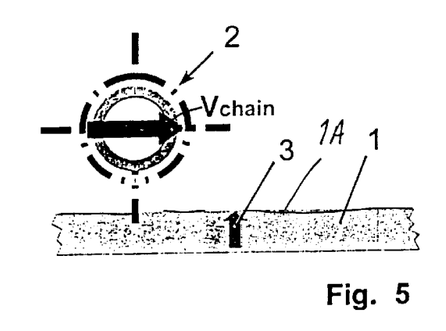
FIGS. 5, 6 and 7 are respective top-view schematic diagrams similar to FIGS. 2, 3 and 4, but showing a rolling bearing with a damaged, excessively worn or especially missing outer ring, passing over the pressure sensing arrangement in three successive stages before, on and after the sensing arrangement.
Figure 5A:
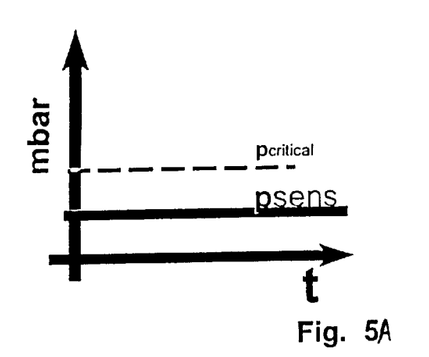
FIGS. 5A, 6A and 7A are pressure-time diagrams similar to FIGS. 2A, 3A and 4A, but showing the progression of the sensed pressure corresponding to the stages of FIGS. 5, 6 and 7 with a damaged or missing outer ring of the rolling bearing.
Figure 6:
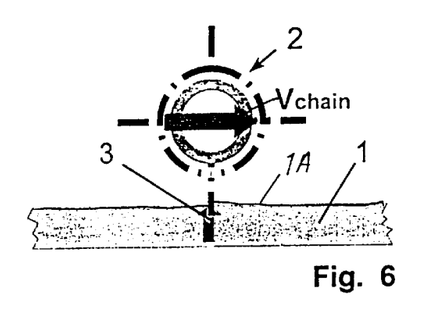
Figure 6A:
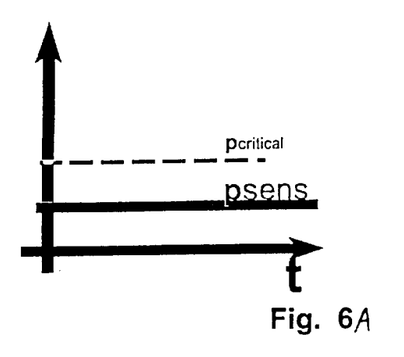
Figure 7:
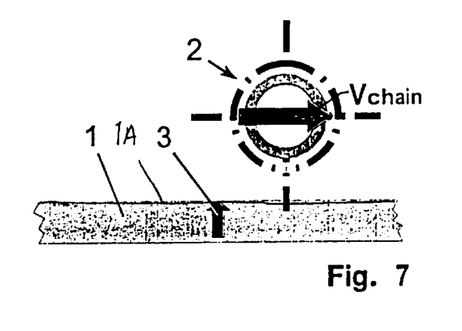

For example, a normal pressure signal will not be received at the expected time, when a respective bearing 2 having an excessively worn outer ring, or from which the outer ring is totally missing due to having ruptured and fallen off, moves over the sensing location as shown in FIGS. 5 to 7 and 5A to 7A. Since the outer ring of the bearing 2 shown in FIGS. 5 to 7 is excessively worn or entirely missing, this bearing 2 remains suspended somewhat spaced away from the contact surface 1A of the guide rail 1, due to the properly supportive neighboring bearings. As a result, the bearing does not cover or block the annular air outlet opening 3B as it moves thereover, and thus does not cause the normally elevated back-pressure to arise in the pressure measuring channel 3C. Thus, the measured pressure in this situation, i.e. psens, does not reach or exceed the critical pressure threshold pcritical, or even may simply remain at the constant neutral level that prevails when a bearing is not at the location of the pressure sensing arrangement.

Figure 7A:
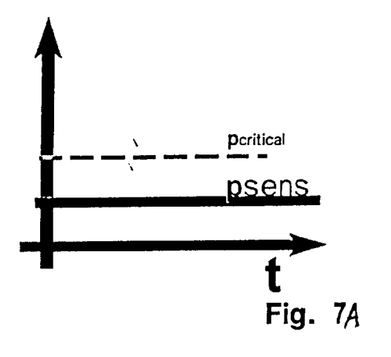

Thus, as shown in the sequence of FIGS. 5A, 6A and 7A, the controller 12 will not receive the expected normal actual pressure signal psens exceeding the critical pressure threshold pcritical at the time when it is expected for the respective bearing 2 to pass over the location of the pressure sensing arrangement (shown in FIGS. 6 and 6A). As a result, the controller 12 determines that this particular bearing 2 is excessively worn, entirely missing its outer ring, or otherwise faulty in its functionality. Responsive thereto, the controller 12 may release or generate a fault signal that may, for example, directly stop the operation of the tentering machine, and/or indicate the faulty bearing to an operator of the machine by displaying a fault message, illuminating a fault signal light, or the like. In this manner, as soon as a single faulty bearing passes the sensing arrangement location, the fault condition can be immediately detected, and appropriate steps may be taken to avoid further damage to the machine.

Figure 8:
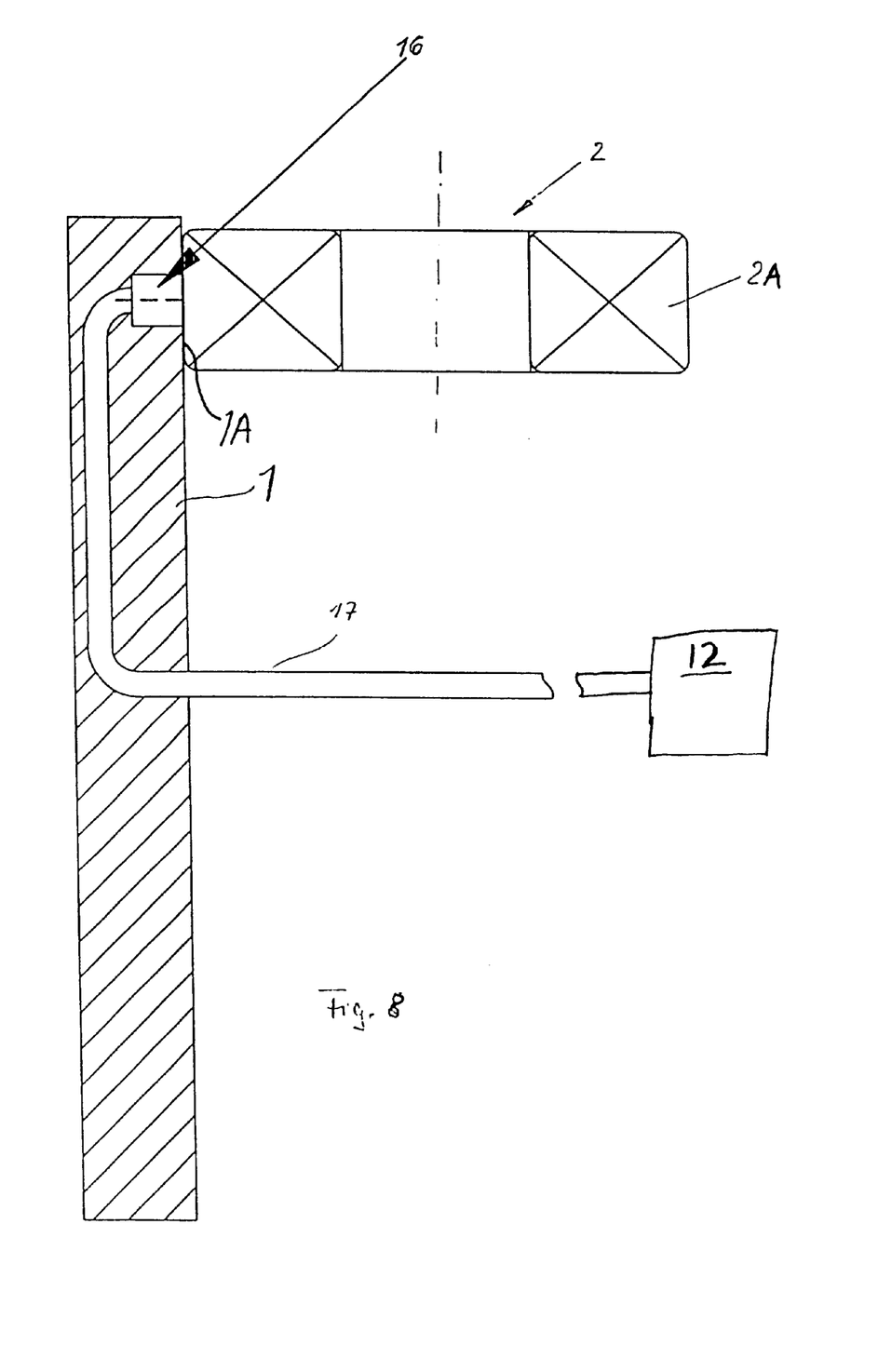
FIG. 8 is a schematic sectional view of an alternative embodiment of the invention using an electromagnetic sensing arrangement integrated into a guide rail.

FIG. 8 shows a further example embodiment of an arrangement for detecting a faulty, excessively worn, or entirely missing outer bearing ring 2A of a rolling bearing 2 of a tenter clip or claw. An electromagnetic sensing arrangement, such as a generally conventional eddy current sensor 16, is integrated into the contact surface 1A of a guide rail 1, whereby a bearing 2 rolls along this contact surface 1A to pass over the location of the eddy current sensor 16. An electrical cable 17 provides a signal transmitting connection from the eddy current sensor 16 to the machine controller 12.

When a normal intact rolling bearing 2 rolls over the location of the eddy current sensor 16 in the contact surface 1A of the guide rail 1, the eddy current sensor 16 senses the presence of the bearing 2 and generates an electrical signal on the cable 17, which signal is interpreted as the passage of a normal intact bearing 2 by the machine controller 12. For example, the eddy current sensor generates an alternating magnetic field that creates eddy currents in the bearing as it passes by the sensing location, whereby the eddy currents in turn have a feedback or responsive effect back on the sensor. For example, the eddy currents change the impedance of a test coil of the sensor, which causes the generation of the corresponding electrical signal indicating the presence and passage of the normal bearing 2. On the other hand, a defective bearing 2 which has lost its outer ring 2A, or has an excessively worn outer ring 2A, will not cause any signal to be emitted by the sensor 16, or only an abnormal signal that does not meet the required threshold parameters. This, in turn, leads to the machine controller 12 triggering or generating a suitable fault indication.

A further embodiment of the invention uses an optoelectronic sensing arrangement, and can be configured or embodied generally as shown in FIG. 8, except with an optoelectronic sensor in place of the eddy current sensor 16. Such an optoelectronic sensor, for example, includes a light source such as a light emitting diode, and a light sensor. When a normal intact bearing 2A passes over the location of the sensing arrangement, it reflects a portion of the light emitted by the light source back to the light sensor, which thereby generates a normal electrical signal indicating the presence and passage of a normal bearing. A faulty bearing passing the location of this optoelectronic sensor will not reflect the normal light and will thereby not cause a normal electrical signal to be generated at the expected time, leading to the release of a fault indication signal.

Figure 9:
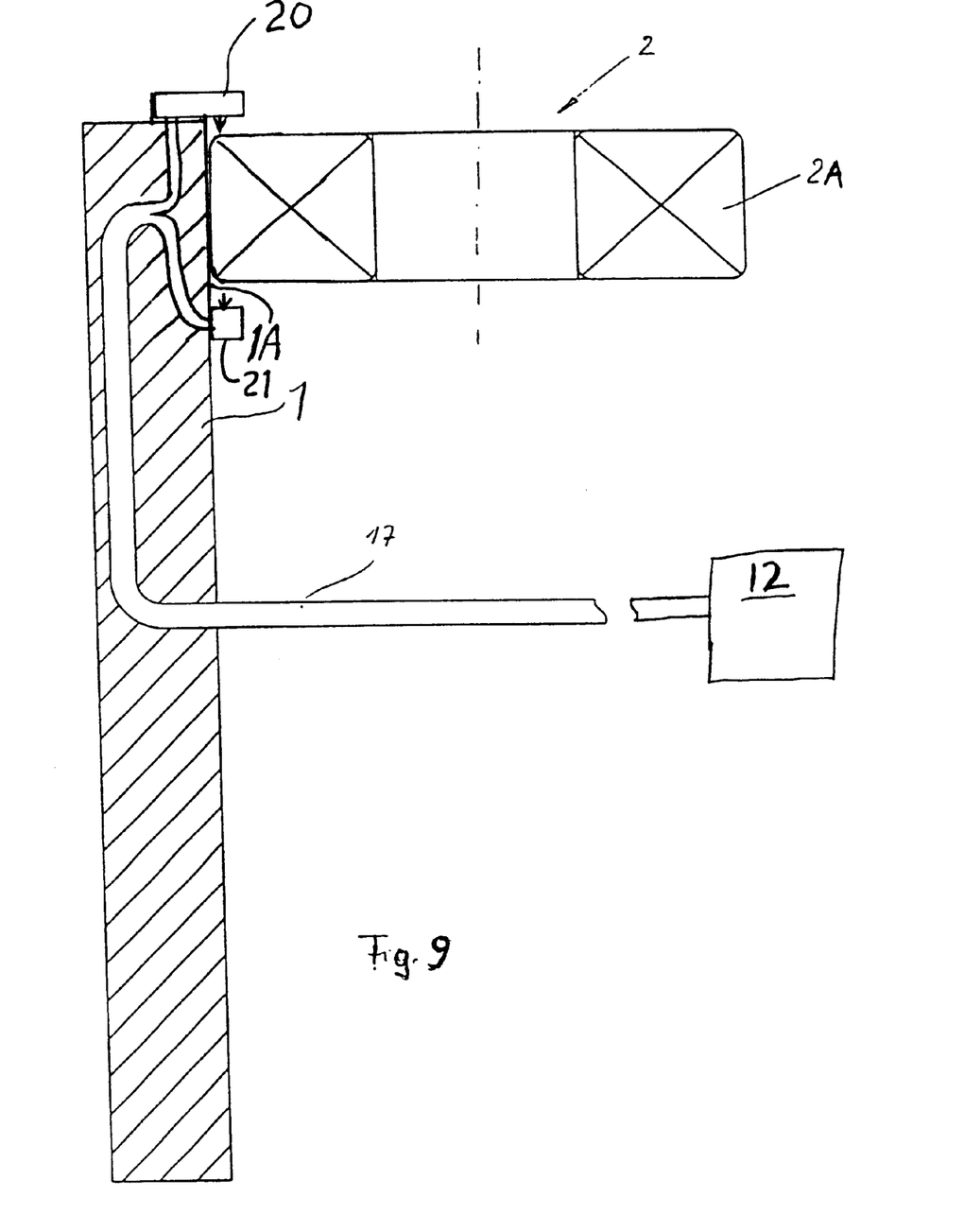
FIG. 9 is a schematic sectional view of a further alternative embodiment using an optoelectronic sensing arrangement integrated into a guide rail.

Another configuration of an optoelectronic sensing arrangement is shown in FIG. 9, which uses a light beam source 20 and a light beam sensor 21 arranged in the normal path of the light beam emitted by the source 20. When a normal intact bearing 2 rolls through the area between the light beam source 20 and the light sensor 21, the outer ring 2A of the bearing 2 interrupts the light beam and thereby interrupts or breaks the light being received by the sensor 21. Such a signal is expected by the controller 12 in a predetermined time period. If the light beam is not blocked or interrupted during such an expected time period, e.g. if the outer ring of a respective bearing is missing, then the controller will generate or release a fault indication signal.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement comprising:
a guide rail having a contact surface;
a plurality of rolling bearings arranged and adapted to roll along said contact surface of said guide rail;
an air pressure sensing arrangement including an air outlet opening provided in said contact surface of said guide rail, and a pressure sensing channel adjacent to said air outlet opening in said guide rail;
a pressurized air source connected to said air outlet opening and adapted to supply and emit pressurized air outwardly through said air outlet opening; and
a pressure sensor connected to said pressure sensing channel and adapted to sense an instantaneous air pressure existing in said pressure sensing channel.

2. The arrangement according to claim 1, wherein said air outlet opening is an annular ring-shaped opening, said pressure sensing channel has a circular opening concentrically within said annular ring-shaped opening, and said openings are located and dimensioned so that said rolling bearings will successively roll over said openings on said contact surface.

3. An arrangement for monitoring a functional condition of a rolling bearing, comprising:
a guide rail having a contact surface;
a plurality of rolling bearings arranged and adapted to move along said contact surface of said guide rail; and
a sensing arrangement that is arranged in or on said guide rail at a sensing location of said contact surface and that is adapted to sense a physical value that is dependent on a physical condition of respective ones of said bearings moving along said contact surface and passing by said sensing location of said sensing arrangement.

4. The arrangement according to claim 3, wherein said sensing arrangement includes a pressurized air outlet adapted to emit a pressurized air flow and a pressure sensor adapted to sense a backed-up pressure of said pressurized air flow being backed-up by one of said bearings at said sensing location, and wherein said physical value is said backed-up pressure.

5. The arrangement according to claim 4,
further comprising a pressurized air source; and
wherein said sensing arrangement comprises a sleeve-shaped body arranged in a hole in said guide rail, said pressurized air outlet is an annular outlet of an annular flow channel bounded between a cylindrical outer wall of said sleeve-shaped body and a cylindrical inner wall of said hole, and said sleeve-shaped body bounds therein a sensing channel that is arranged coaxially relative to said annular flow channel;
wherein said sensing arrangement further comprises a pressurized air line connecting said pressurized air source to said annular flow channel; and
wherein said sensing arrangement further comprises a pressure measuring line connecting said pressure sensing channel to said pressure sensor.

6. The arrangement according to claim 5, further comprising a multi-path valve interposed in said pressure measuring line between said pressure sensing channel and said pressure sensor.

7. The arrangement according to claim 6, wherein said pressurized air source is further connected to said multi-path valve, and said multi-path valve is selectively switchable so as to selectively connect said pressure sensing channel via said pressure measuring line to said pressurized air source rather than to said pressure sensor.

8. The arrangement according to claim 5, further comprising a machine controller and a signal line connecting said pressure sensor to said machine controller.

9. The arrangement according to claim 3, wherein said sensing arrangement is an electromagnetic sensing arrangement, and said physical value is an influence imposed by one of said bearings on an electromagnetic field that is generated by said electromagnetic sensing arrangement.

10. The arrangement according to claim 9, wherein said electromagnetic sensing arrangement comprises an eddy current sensor arranged in said guide rail at said sensing location.

11. The arrangement according to claim 3, wherein said sensing arrangement is an optoelectronic sensing arrangement, and said physical value is an influence imposed by one of said bearings on a light beam that is generated by said optoelectronic sensing arrangement.

12. The arrangement according to claim 11, wherein said optoelectronic sensing arrangement comprises a light beam source adapted to generate a light beam and a light beam sensor arranged to receive said light beam, with a rolling path of said bearings extending between said light beam source and said light beam sensor.

13. A method of using the arrangement according to claim 3, comprising the steps:
a) moving said bearings along said contact surface of said guide rail successively past said sensing location;
b) sensing said physical value using said sensing arrangement as each one of said bearings successively moves past said sensing location;
c) generating a signal that corresponds to said physical value being sensed and that is indicative of a functional condition respectively of each one of said bearings successively moving past said sensing location;
d) comparing said signal to an acceptable threshold or an acceptable range; and
e) providing a fault signal if a result of said step d) is that said signal unacceptably deviates from said acceptable threshold or said acceptable range.

14. The method according to claim 13, wherein said comparing in said step d) is carried out for a time segment of said signal in which a respective one of said bearings is expected to move past said sensing location.

* * * * *